United States Patent [19]
Patel et al.

[11] Patent Number: 5,132,824
[45] Date of Patent: Jul. 21, 1992

[54] LIQUID-CRYSTAL MODULATOR ARRAY

[75] Inventors: Jayantilal S. Patel, Red Bank; Andrew M. Weiner, Eatontown, both of N.J.

[73] Assignee: Bell Communications Research, Inc., Livingston, N.J.

[21] Appl. No.: 651,028

[22] Filed: Feb. 5, 1991

Related U.S. Application Data

[63] Continuation-in-part of Ser. No. 598,476, Oct. 16, 1990, which is a continuation-in-part of Ser. No. 577,220, Aug. 31, 1990.

[51] Int. Cl.$^5$ .................. G02F 1/1337; G02F 1/1343; G02F 1/137; G02B 27/46
[52] U.S. Cl. ........................................ 359/78; 359/36; 359/87; 359/94; 359/559
[58] Field of Search ............... 350/341, 162.12, 347 V, 350/347 E; 359/54, 78, 87, 93, 94, 36, 559

[56] References Cited

U.S. PATENT DOCUMENTS

| | | | |
|---|---|---|---|
| 4,586,791 | 5/1986 | Isogai et al. | 350/341 |
| 4,655,547 | 4/1987 | Heritage et al. | 350/162.12 |
| 4,746,193 | 5/1988 | Heritage et al. | 350/162.12 |
| 4,779,959 | 10/1988 | Saunders | 350/347 E |
| 5,018,835 | 5/1991 | Dorschner | 359/87 |

OTHER PUBLICATIONS

J. S. Patel et al., "A reliable method of alignment for smectic liquid crystals," *Ferroelectrics*, 1984, vol. 59, pp. 137-144.

A. M. Weiner et al., "Programmable femtosecond pulse shaping by use of a multielement liquid-crystal phase modulator," *Optics Letters*, 1990, vol. 15, pp. 326-328.

Meadowlark Optics, *Polarization Optics Catalog & Handbook*, 1990, Longmont, Colorado, pp. 20, 22.

A. M. Weiner et al., "Picosecond and femtosecond Fourier pulse shape synthesis," *Revue de Physique Appliquee*, 1987, vol. 22, pp. 1619-1628.

*Primary Examiner*—Stanley D. Miller
*Assistant Examiner*—Anita Pellman Gross
*Attorney, Agent, or Firm*—Leonard Charles Suchyta; Charles S. Guenzer

[57] ABSTRACT

A liquid-crystal phase modulator array, comprising a planar electrode on one glass support and an array of finger electrodes on the other glass support with a nematic liquid filling the gap between the two supports. The alignment layer between the finger electrodes and the liquid crystal is rubbed to have an alignment direction extending along the finger electrodes and prependicular to the gap between them. The alignment layer between the planar electrode and the liquid crystal is rubbed in the anti-parallel direction. Voltages are selectively applied to different ones of the finger electrodes to provide a phase modulator array for light passing through the assembly. The alignment direction of the invention eliminates ragged edges adjacent the edges of the finger electrodes arising from an instability. Thereby, the finger electrodes can be made much narrower, and more pixels can be included in the array. The phase modulator of the invention can be advantageously used in a Fourier optical pulse shaper.

13 Claims, 5 Drawing Sheets

LIQUID-CRYSTAL MODULATOR ARRAY

RELATED APPLICATIONS

This is a continuation-in-part of Ser. No. 07/598,476, filed Oct. 16, 1990, which is a continuation-in-part of Ser. No. 07/577,220, filed Aug. 31, 1990.

FIELD OF THE INVENTION

The invention relates generally to liquid crystals. In particular, the invention relates to an array of electrically controllable liquid-crystal modulators.

BACKGROUND ART

A technique has been developed over the past few years that can change the shape of a very short optical pulse. As is illustrated in FIG. 1 and as has been disclosed by Heritage et al. in U.S. Pat. No. 4,655,547 in slightly different form, a pulsed laser 10 outputs an input optical pulse 12, which irradiates a diffraction grating 14. Only the envelope of the pulse 12 is shown. Although it has a carrier frequency $f_0 = 2\pi\omega_0$, its pulse width $\Delta t$ is narrow enough compared to the carrier frequency so that the pulse 12 contains a significant frequency distribution $\Delta\omega$ about $\omega_0$.

The time dependence of the intensity of the optical pulse 12 is given by $I_{in}(t)$, which is related to the electric field $e_{in}(t)$ by $$I_{in}(t) = |e_{in}(t)|^2 \tag{1}$$

The electric field amplitudes $e_{in}(t)$ can be expressed as the Fourier transform of the frequency components $E_{in}(\omega)$, which contain both real and imaginary components:

$$e_{in}(t) = \int d\omega e^{i\omega t} E_{in}(\omega) \tag{2}$$

The integral in principle extends over an infinite range for $\omega$, but in practice it needs only extend approximately over the range $\Delta\omega$ centered about $\omega_0$.

The diffraction grating 14 spatially separates the frequency components $E_{in}(\omega)$, which are then focused by a lens 16 onto different spatial portions of a mask 18. The mask 18 changes the frequency components from $E_{in}(\omega)$ to $E_{out}(\omega)$. A second lens 20 refocuses the frequency components $E_{out}(\omega)$ onto a second diffraction grating 22, which, acting conversely to the first diffraction grating 14, reforms the frequency components into an output pulse 12 having a time dependence $e_{out}(t)$. However, because of the changes of the frequency components from $E_{in}(\omega)$ to $E_{out}(\omega)$, the output pulse 24 differs in shape from the input pulse 12, in particular, $$e_{out}(t) = \int d\omega e^{i\omega t} E_{out}(\omega) \tag{3}$$

The original proposal envisioned masks 18 which could adjust both the amplitude and phase of the different frequency components $E_{in}(\omega)$. Some of the early experiments involved amplitude masks 18 in which the magnitudes of $E_{out}(\omega)$ are selectively reduced from those of $E_{in}(\omega)$, but the phases are not changed. Amplitude masks, however, necessarily reduce the total optical power, particularly when it is desired to produce significant changes between the pulse shapes 12 and 24. Therefore, later work concentrated on phase masks 18 in which the magnitudes of the frequency components $E_{in}(\omega)$ are not changed (or at least there is constant reduction for all components), but there are selective changes $\phi$ in the phases, that is, $$E_{out}(\omega) = e^{i\Phi(\omega)} E_{in}(\omega) \tag{4}$$

A binary phase mask 18 is one in which $\phi(\omega)$ can assume one of two values 0 and $\pi$, and it can be easily made by using a photolithographic process to etch selected portions of a dielectric plate to a phase depth of $\pi$, that is, a physical depth of $\lambda/2 \cdot n$, where $\lambda$ is the wavelength of the light and n is the refractive index of the plate material. An etched phase mask, however, suffers from the disadvantage that once it is made it cannot be changed to produce a different output pulse from the same input pulse. It would be preferred to electrically control the phases to obtain differently shaped outputs from similarly shaped input pulses. Furthermore, it is difficult to etch non-binary or gray-scale phase masks in which $\phi$ can assume a full range of values between 0 and $2\pi$.

To overcome these disadvantages, Weiner et al. disclosed a programmable liquid-crystal phase modulator array in "Programmable femtosecond pulse shaping by use of a multielement liquid-crystal phase modulator," *Optics Letters*, volume 15, 1990, pages 326–328. The modulator comprised two glass plates sandwiching a 4 $\mu$m layer of a nematic liquid crystal. The inner surface of one of the plates was patterned, as illustrated in the schematic plan view in FIG. 2, into a linear array of thirty-two independent electrodes 30 of transparent indium tin oxide (ITO). The electrodes 30 were spaced on 100 $\mu$m centers and were separated by 5 $\mu$m gaps 32 where the ITO was removed. Individual lead wires 34 were attached to the electrodes 30. The inner surface of the other plate was covered, as illustrated in plan view in FIG. 3, with ITO to form a common counter electrode or ground 36 with its lead wire 38. An opaque metal film 40 defined a 3.2 mm wide optically active area.

Diffraction gratings act as optical polarizers so that the input grating 14 caused the light to be predominantly polarized along the direction $P_1$ of the array, that is, along the short direction of the electrodes 30 and across the gaps 32. Therefore, Weiner et al. aligned the nematic liquid crystal along a direction $A_1$ parallel to the polarization direction $P_1$ on both of the plates 18 and thus perpendicular to the fingers of the electrodes 30. As the voltage applied between the electrodes 30 and 36 is increased, the liquid-crystal molecules increasingly become aligned with the applied field along the optical propagation path. The induced change in refractive index increases with the mean degree of rotation. Thereby, a selectively applied electric field will introduce a selected amount of phase $\phi$ into the frequency component $E_{in}(\omega)$ traversing that electrode 30. The polarization direction $P_1$ of the light does not change as it traverses the pixels of the array. With this programmable liquid-crystal phase modulator, Weiner et al. were able to introduce arbitrary sets of either binary or gray-scale phase changes $\phi(\omega)$ to the frequency components $E_{in}(\omega)$.

A similar liquid-crystal modulator array is commercially available from Meadowlark Optics of Longmont, Colo. As is shown on page 22 of their *Polarization Optics Catalog & Handbook* (1990), their seventy electrodes 30 are 100 $\mu$m wide and the gaps 32 are 15 $\mu$m wide. When voltage is applied to the electrodes, the transmitted light becomes increasingly elliptically polarized at small increments of voltage, and the polarization is thus rotated 90° at a set higher voltage. The modulator array is primarily intended as an amplitude modulator. Because of its wide operating bandwidth and consistent with its low transmission values, their liquid crystal appears to be a twisted nematic which means that they align their liquid crystal along the direction $A_1$ for one of the electrodes and along the perpendicular direction for the other electrode. However, the alignment direction at the segmented electrode is unknown.

We have attempted to improve on the phase modulator array of Weiner et al. by increasing the number of electrodes 30 and by decreasing the size of the gap 32. An increased number of electrodes 30 allows the quantized frequency ranges inherent in a discrete array of pixels to more closely approximate the continuous and infinite frequency variation found in the integrals of Equations (1) and (2) and thus to alternatively increase the spectral resolution available with the array or extend its use to longer pulses. Weiner et al. has discussed the limitations of a discrete modulator array in "Picosecond and femtosecond Fourier pulse shape synthesis," *Revue de Physique Appliquee*, volume 22, 1987, pages 1619-1628. Let $\delta t$ be the smallest independent temporal feature in either the input or output pulse and let $\Delta t$ be the longest feature, that is, the pulse width. These quantities are related to the frequency resolution $\delta \omega$, the frequency bandwidth $\Delta \omega$, and the number of elements N in the array by $$\frac{1}{N} \approx \frac{\delta \omega}{\Delta \omega} = \frac{\delta t}{\Delta t}. \tag{5}$$

An increase in the number N of electrodes corresponds to a decrease in the width of the electrodes 30 if reasonably sized optics are to be retained. The gaps 32 should be reduced in size because the liquid crystal beneath the finite-size gaps 32 is not electrically controlled near its surface with the gap 32 and in the interior is acted upon by an average of the particular combination of voltages applied to the electrodes 30 bordering the gap 32. The gaps 32 thus represent frequency ranges $\omega$ in which the phase $\phi(\omega)$ is not well controlled, thus imposing an uncontrolled component on the phase control and resultant pulse shaping.

However, the desired reduction in the size of the electrodes 30 was found to be limited by a phenomena we observed in the area bordering the gaps 32. For these narrow electrodes 30, the orientational boundary of the liquid crystal at the gap 32 was observed to assume a ragged edge extending over the electrode for a distance of a few microns and with a period of a few microns. The effect appears to arise from the transition from voltage-induced alignment above the electrode 30 to no alignment above the gap 32. The ragged edge was even observed when the same voltage was applied to neighboring pixels but was intensified when neighboring electrodes 30 were activated to produce significantly different phase changes, for example, 0 and $\pi$. The ragged edge produces large scattering that prevents high-fidelity pulse shaping. The dimensions of the instability are consistent with typical liquid-crystal coherence lengths. The problem due to the instability will be less noticeable for electrodes wider than 25 or 50 $\mu m$.

FIG. 4 of the parent application, Ser. No. 07/598,476, illustrates an array of liquid-crystal filters. This figure represented a conceptual design, and the illustrated alignment direction of the liquid crystal perpendicular to the fingers of the array electrode was not intended to describe the preferred orientation.

SUMMARY OF THE INVENTION

Accordingly, an object of the invention is to provide a liquid-crystal modulator array.

Another object of the invention is to provide such an array having a large number of pixels and very small gaps between the pixels.

Yet a further object of the invention is provide for such an array without any instability of the liquid crystal adjacent the gap.

The invention can be summarized as a liquid-crystal modulator array for modulating the phase of a spatially dispersed optical signal. The array is formed by placing on one side of the liquid crystal parallel independent electrodes separated by gaps. The liquid crystal is aligned parallel to the electrodes. The phase array modulator can advantageously be used in a Fourier optical pulse shaper.

DETAILED DESCRIPTION OF THE PREFERRED EMBODIMENTS

Figure 1:
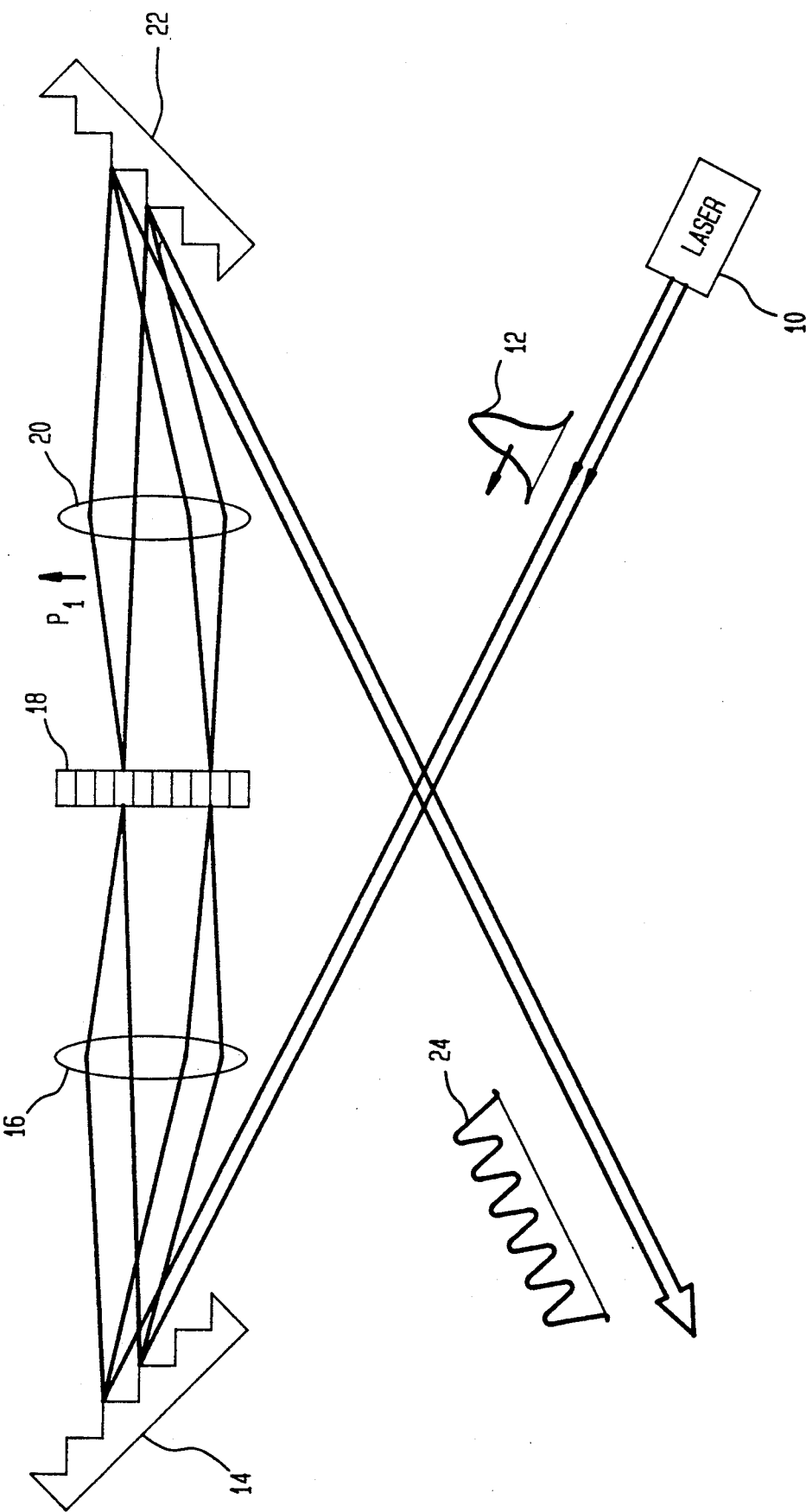
FIG. 1 is an schematic illustration of a prior art optical pulse shaper.
Figure 2:
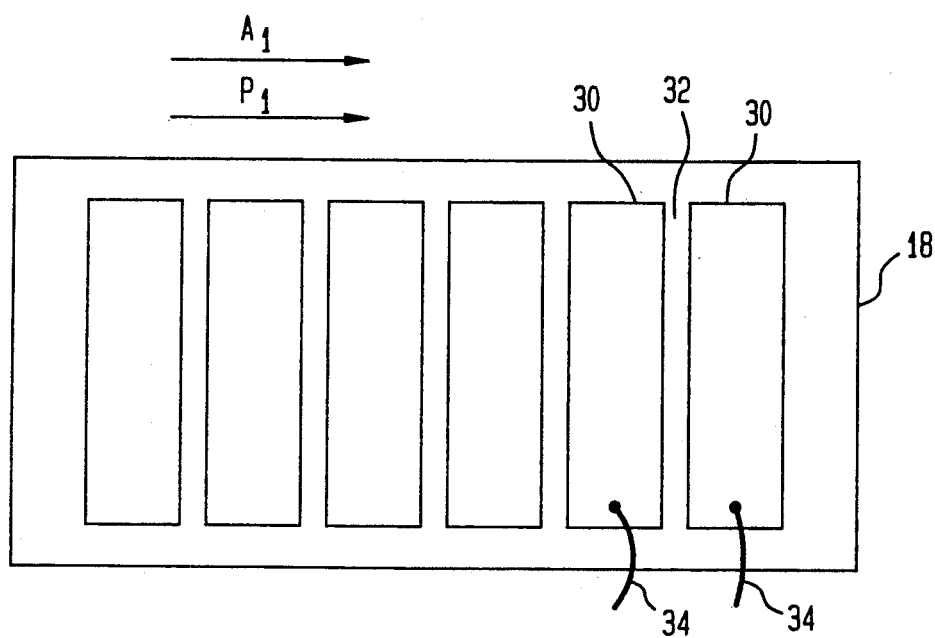
FIG. 2 is a schematic plan view of the array electrode structure of a liquid crystal modulator.
Figure 3:
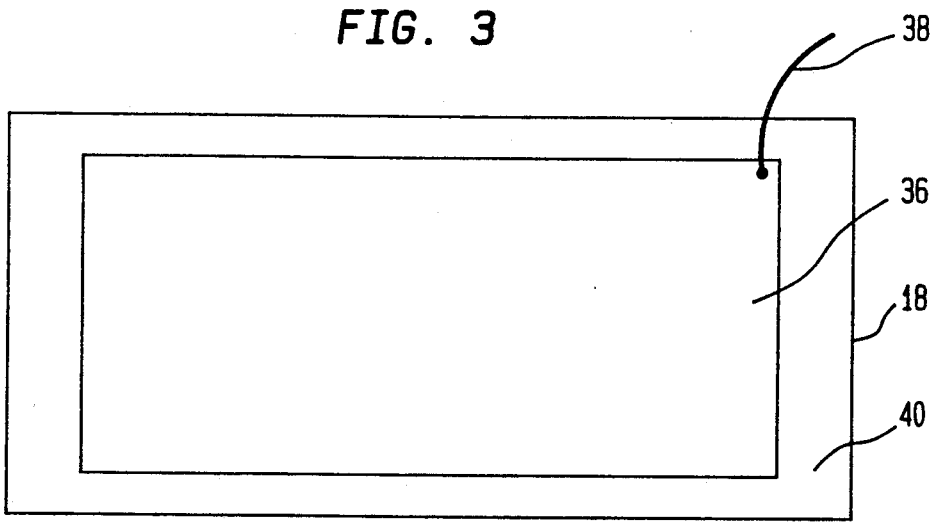
FIG. 3 is a schematic plan view of the common electrode of a liquid crystal modulator.
Figure 4:
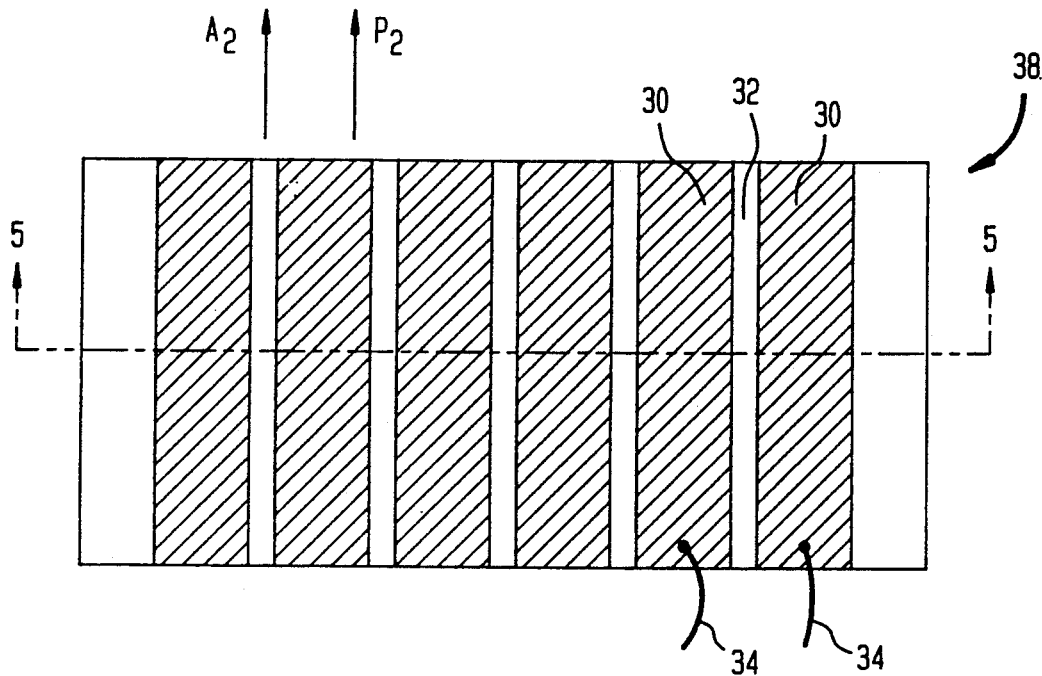
FIG. 4 is a schematic plan view of the array electrode structure of the liquid crystal modulator of the present invention.
Figure 5:
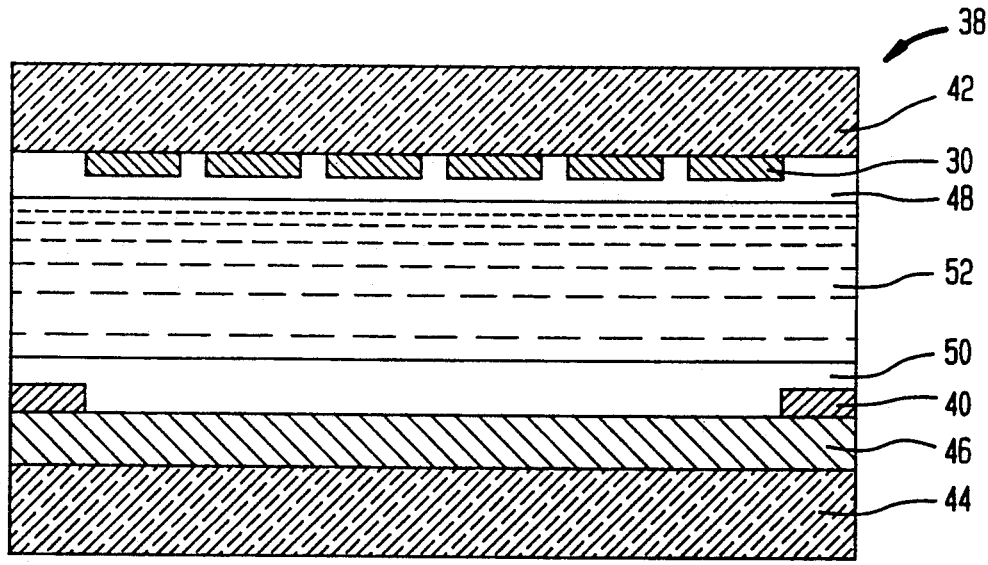
FIG. 5 is a cross-sectional view of the liquid crystal modulator of FIG. 4 taken along the sectional line 5—5.

In the present invention, the liquid crystal in a liquid crystal modulator 38 is aligned to be parallel to the fingers of a multi-element electrode array. As illustrated in the schematic plan view of FIG. 4, the liquid crystal is aligned along a direction $A_2$ that extends along the long direction of the electrodes 30 and thus is perpendicular to the gaps 32. The liquid crystal phase modulator 38 induces phase changes in light polarized along the direction $P_2$ parallel to the alignment direction $A_2$.

A liquid crystal modulator of the invention has been fabricated according to the following method. Two soda-lime glass plates 42 and 44 served as substrates, were 1.63 mm (0.064") thick and were purchased from Donneley Corp. of Michigan. Both plates 42 and 44 were coated with a transparent conductive coating of indium tin oxide, cleaned using an ultrasonic bath containing detergent, and then thoroughly rinsed with water. Photoresist was spun on the one plate 42 on which the patterned electrodes 30 were to be formed to a thickness of about a micrometer using conventional spinning techniques used in semiconductor processing. The photoresist was exposed to the desired pattern of the electrodes 30 and developed. In particular, 128 electrodes 30 were on 40 $\mu m$ spacings with 2.5 $\mu m$ gaps 32. They had lengths of between 3 and 5 mm, thus easily satisfying a criterion of an especially useful length-to-width ratio of at least 10. This ratio guarantees that, regardless of the height of the optical beam, the ragged instability is localized to a small portion of the electrode adjacent to its corners. The plate 42 was then dipped in a bath of 50% concentrated hydrochloric acid containing 8% nitric acid for 15 minutes at room temperature to etch the indium tin oxide electrodes 30. After etching, the plate 42 was thoroughly washed, again cleaned with detergent, and rinsed with water. The other plate 44 was left with an unpatterned common electrode 46, but was patterned on its periphery with the opaque metal mask 40 of chromium.

The plates 42 and 44 were briefly cleaned and coated with respective polymeric alignment layers 48 and 50 following the procedure described by Patel et al. in "A reliable method of alignment for smectic liquid crystals", *Ferroelectrics*, volume 59, 1984, pages 137-144. The alignment polymer was coated to a thickness of approximately 50 nm and dried in an oven for 1 hour at 140° C. Both alignment layers 48 and 50 were rubbed along the long axes of the electrodes 30 to establish the alignment direction $A_2$. The plates 42 and 44 were assembled together with a cell gap of 4 $\mu$m. The cell gap should not be significantly larger than the inter-electrode gap 32 to reduce the overlap of electrical fields from neighboring electrodes 30. The structure was assembled by placing four UV curable epoxy dots over the alignment layer 50 at the corners of the plate structure. The epoxy was previously mixed with 4 $\mu$m rod spacers available from EM Chemicals of Hawthorne, N.Y. The two plate structures were placed together with the epoxy dots therebetween and with the alignment directions of the two alignment layers 48 and 50 being anti-parallel. Somewhat inferior results would have been obtained if the alignment directions had been parallel. The cell gap of 4 $\mu$m was uniformly established by observing the cell under monochromatic light and manually applying pressure so as to minimize the number of optical fringes. The structure was fixed by hardening the UV curable epoxy by exposure to UV radiation. The assembly was heated to well above the isotropic point of the liquid crystal, and nematic liquid crystal material 52, type E7 available from EM Chemicals, was flowed into the cell gap using a standard vacuum technique. Because of the alignment direction $A_2$, the liquid crystals had their long axes extending parallel or anti-parallel to $A_2$. Separate electric leads 34 were attached to the digitated electrodes 30 and the common counter electrode 46. In the experimental device, edges of the support 42 having the ends of the digitated electrodes 30 overhung the other support 44, and an edge of that support 44 having the common electrode 46 overhung the first support 42 so as to expose the electrodes 30 and 46 for electrode clamps.

The liquid crystal phase modulator 38 was then tested. On transmission, it exhibited very clean edges adjacent the gaps 32 and none of the ragged-edge instability. It was further tested in the Fourier pulse shaper of FIG. 6 in which its electrodes 32 had their long axes extending perpendicularly to the plane of the illustration. Because the gratings 14 and 22 require light polarized in a direction perpendicular to the polarization direction $P_2$ of the modulator array 38, two half-wave plates are inserted to perform the required 90° rotation.

In one experiment, a phase ramp was imposed on the pixels of the array with a phase jump of $\pi/4$ between neighboring pixels. The modulator was able to shift a narrow pulse by $\pm 1.5$ psec with no appreciable side lobes, compared to $\pm 0.6$ psec and observable side lobes with the 32-element array.

The larger number N of pixels in the modulator array allows for more complex and demanding pulse shaping. For example, quadratic dispersion can be fairly easily eliminated or compensated on optical fibers, but it is more difficult to compensate for cubic dispersion. We used the 128-element phase modulator to impose a cubic phase sweep having a phase shift in radians of:

$$\phi = A\pi(n-63)^3 \qquad (6)$$

where n is the pixel number and A is a constant. It transformed a short input pulse into an output pulse having an oscillatory tail extending for 2.5 psec when $A = 8 \times 10^{-5}$. The time direction of the tail can be reversed by using the negative of the phase shift given above.

Figure 6:
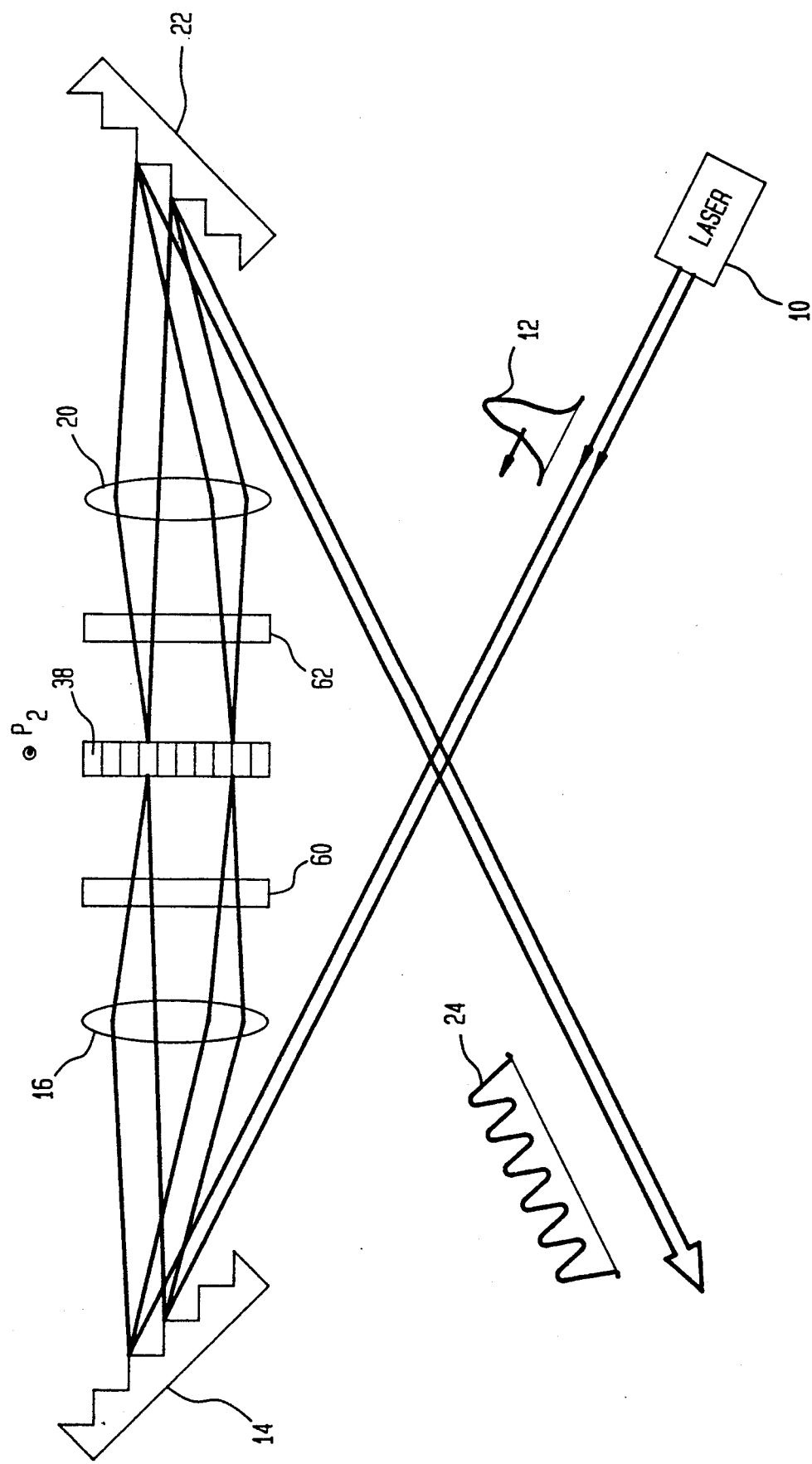
FIG. 6 is a schematic illustration of an optical pulse shaper using the phase modulator array of the invention.
Figure 7:
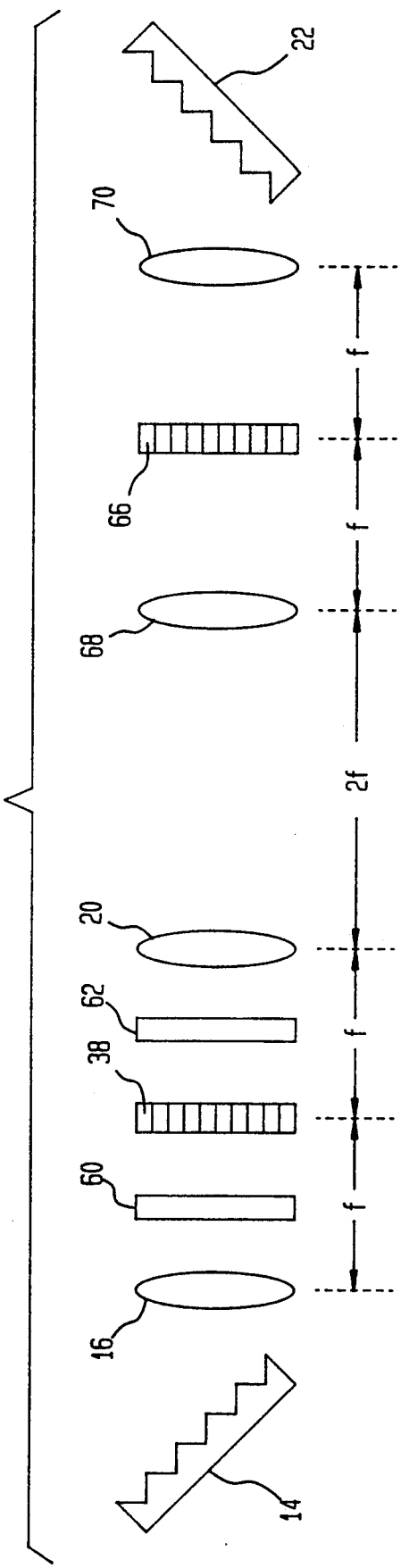
FIG. 7 is a schematic illustration of part of a further improved optical pulse shaper.

The Fourier pulse shaper of FIG. 6 can be improved by providing for both phase and amplitude modulation of the input pulse to thus provide arbitrary pulse shaping. This could be accomplished by positioning the phase modulator 38 of the invention back-to-back with a conventional liquid crystal amplitude modulator array, for example, the array described previously from Meadowlark. However, it is preferred to arrange an amplitude modulator array 66, as illustrated in FIG. 7, at the focal points of a set of lenses 68 and 70 and separated from the optics of the phase array modulator 38. Thereby, one modulator array is imaged on the other modulator array. The illustration assumes all lenses 16, 20, 68, and 70 have focal lengths f. A difference in the focal lengths would allow for differently sized modulators 38 and 66.

The liquid-crystal modulator array of the invention thus allows the miniaturization of such an array without sacrificing fidelity. Thereby, liquid-crystal arrays, particularly phase modulator arrays, can provide superior performance and be used in more demanding applications.

What is claimed is:

1. A liquid-crystal modulator array, comprising:
   a first support having formed thereon an array of electrodes extending in parallel in a first electrode direction and having respective lengths, widths, and ratios of said respective lengths to said respective widths of at least 10;
   a second support separated from said first support by a cell gap and having formed thereon a common electrode facing all of said array of electrodes along their said respective widths;
   a first alignment layer disposed on said first support on its side facing said cell gap and having a first alignment direction parallel to said first electrode direction; and
   a liquid crystal filling said cell gap and being at least partially aligned by said first alignment layer.

2. A liquid-crystal modulator array as recited in claim 1, further comprising a second alignment layer disposed on said second support on its side facing said cell gap and having a second alignment direction substantially parallel or anti-parallel to said first alignment direction, said liquid crystal being partially aligned by said second alignment layer.

3. A liquid-crystal modulator array as recited in claim 2, wherein said liquid crystal is a nematic liquid crystal.

4. A liquid-crystal modulator array as recited in claim 3, wherein electrodes in said array have widths perpendicular to said first direction of less than 50 μm.

5. A liquid-crystal modulator array system including the liquid-crystal modulator array recited in claim 2, wherein said supports, electrodes, alignment layers, and liquid crystal form a phase modulator array and further comprising:
   an amplitude modulator array; and
   an optical system focusing input light at a first one of said phase and amplitude modulator arrays and focusing light passing through said first one modulator array at a second one of said phase and amplitude modulator arrays.

6. A liquid-crystal phase modulator array, comprising:
   a first transparent support;
   a plurality of parallel electrodes formed on said first support and extending along a first electrode direction and having electrode gaps formed between neighboring ones of said parallel electrodes;
   a first alignment layer formed over said parallel electrodes and having an alignment direction parallel to said first electrode direction;
   a second transparent support;
   a common electrode formed on said second support;
   a second alignment layer formed over said common electrode and having an alignment direction anti-parallel to said first electrode direction, said first and second alignment layers being separated by a cell gap; and
   a liquid crystal filling said cell gap and being aligned adjacent to boundaries of said cell gap by said first and second alignment layers.

7. A phase modulator array as recited in claim 6, wherein said liquid crystal comprises a nematic liquid crystal.

8. A phase modulator array as recited in claim 7, wherein said parallel electrodes have widths perpendicular to said first electrode direction of less than 50 μm.

9. A phase modulator array as recited in claim 8, wherein said parallel electrodes have a length-to-width ratio of at least 10.

10. A phase modulator array as recited in claim 9, wherein said electrode gaps have widths of no more than 2.5 μm.

11. A Fourier pulse shaper, comprising:
   a liquid-crystal modulator array comprising a first support having formed thereon an array of electrodes extending in parallel in a first electrode direction, a second support separated from said first support by a cell gap and having formed thereon at least one electrode, a first alignment layer disposed on said first support on its side facing said cell gap and having a first alignment direction parallel to said first electrode direction, a second alignment layer disposed on said second support on its side facing said cell gap and having a second alignment direction substantially parallel or anti-parallel to said first alignment direction, and a liquid crystal filling said cell gap and being at least partially aligned by said first and said second alignment layers;
   first energy dispersive means for spatially separating frequency components of an input beam into a frequency-dispersed beam impinging said liquid-crystal modulator array, said different frequency components impinging portions of said modulator array corresponding to different ones of said array of electrodes; and
   second energy dispersive means for recombining portions of said frequency components passing through said modulator array into an output beam.

12. A Fourier pulse shaper as recited in claim 11, wherein said first and second energy dispersive means comprise diffraction gratings and further comprising polarization rotating means interposed between each of said gratings and said modulator array.

13. A Fourier pulse shaper as recited in claim 11, wherein the liquid-crystal modulator array is a phase modulator array and further comprising:
   an amplitude modulator array; and
   an optical system focusing said frequency-dispersed beam at a first one of said phase and amplitude modulator arrays and focusing light passing through said first one modulator array at a second one of said phase and amplitude modulator arrays.

* * * * *